(12) United States Patent
Loewen

(10) Patent No.: US 9,970,557 B2
(45) Date of Patent: May 15, 2018

(54) MULTI-PILOT VARIABLE PRESSURE RELAY VALVE

(71) Applicant: Travis Victor Dean Loewen, Bettendorf, IA (US)

(72) Inventor: Travis Victor Dean Loewen, Bettendorf, IA (US)

( * ) Notice: Subject to any disclaimer, the term of this patent is extended or adjusted under 35 U.S.C. 154(b) by 0 days. days.

(21) Appl. No.: 15/193,572

(22) Filed: Jun. 27, 2016

(65) Prior Publication Data

US 2017/0370485 A1    Dec. 28, 2017

(51) Int. Cl.
  *F15B 13/043* (2006.01)
  *F16K 11/07* (2006.01)
  *G05D 16/10* (2006.01)

(52) U.S. Cl.
  CPC ............ *F16K 11/07* (2013.01); *G05D 16/106* (2013.01)

(58) Field of Classification Search
  CPC . F16K 11/07; G05D 16/06; Y10T 137/87193; Y10T 137/87257; Y10T 137/87153; Y10T 137/86549; Y10T 137/86582; Y10T 137/8671; Y10T 137/86767; Y10T 137/86783; Y10T 137/2544
  USPC .. 137/596.14, 598, 494, 522, 625.17, 625.6, 137/625.69, 625.34, 625.36, 102
  See application file for complete search history.

(56) References Cited

U.S. PATENT DOCUMENTS

| | | | | |
|---|---|---|---|---|
| 2,775,982 A | * | 1/1957 | Canfield | F15B 13/0431 137/625.64 |
| 2,966,891 A | * | 1/1961 | Williams | F15B 9/08 137/625.66 |
| 2,979,080 A | * | 4/1961 | Hewitt | F16K 11/0716 137/625.68 |
| 3,286,734 A | * | 11/1966 | Hartshorne | B60T 8/363 137/116.3 |
| 3,736,958 A | * | 6/1973 | Rostad | F16K 11/07 137/625.6 |

(Continued)

FOREIGN PATENT DOCUMENTS

| | | |
|---|---|---|
| EP | 0713813 A2 | 5/1996 |
| EP | 0825365 B1 | 6/2004 |
| WO | 1997007001 A1 | 2/1997 |

OTHER PUBLICATIONS

Garuti, A.; Hydraulic Trailer Braking System; Oct. 20, 2005; Safim; Italy.

(Continued)

*Primary Examiner* — Minh Le
(74) *Attorney, Agent, or Firm* — Steven H. Washam; Washam PLLC

(57) ABSTRACT

The improved hydraulic control valve includes a spool with a primary side piston having a rigid linkage with a secondary side piston. The primary side providing the ability to tap into an existing hydraulic system without altering the existing hydraulic system pressures or fluid volume. The secondary side piston and associated ports form a regulating assembly for control of the pressures of a hydraulic system and for providing feedback to the primary. The primary and secondary piston sizes may be stepped to create an appropriate amplification ratio for the required secondary brake system pressures in relation to the primary. Multiple secondary pilot signals and multiple primary pilot signals are also envisioned.

20 Claims, 7 Drawing Sheets

(56) References Cited

U.S. PATENT DOCUMENTS

| | | | | |
|---|---|---|---|---|
| 3,774,641 | A | * | 11/1973 | Mindner ................. B64C 13/00 137/625.64 |
| 3,929,381 | A | * | 12/1975 | Durling ................. B60T 13/263 303/118.1 |
| 4,133,510 | A | * | 1/1979 | Lorimor .............. F15B 13/0402 137/269 |
| 4,188,976 | A | * | 2/1980 | Austin, Jr. ........... A61C 1/0061 137/596.14 |
| 4,197,878 | A | * | 4/1980 | Thompson .......... F15B 13/0402 137/625.6 |
| 4,466,312 | A | * | 8/1984 | Oguma ................... F16H 15/38 476/10 |
| 4,469,011 | A | * | 9/1984 | Loffler ................. F16H 61/065 137/625.6 |
| 4,785,849 | A | * | 11/1988 | Masuda ............. G05D 16/2093 137/625.6 |
| 4,895,192 | A | * | 1/1990 | Mortenson ............ F01M 11/04 137/625.68 |
| 5,005,919 | A | | 4/1991 | Shuey et al. |
| 5,538,336 | A | | 7/1996 | Reuter et al. |
| 5,590,936 | A | | 1/1997 | Reuter |
| 5,607,208 | A | | 3/1997 | Reuter et al. |
| 5,618,086 | A | | 4/1997 | Reuter |
| 5,741,050 | A | | 4/1998 | Ganzel et al. |
| 6,050,081 | A | * | 4/2000 | Jansen .................... F02C 7/232 137/112 |
| 7,000,892 | B2 | * | 2/2006 | Kim ....................... F16K 11/07 137/625.65 |
| 7,028,821 | B2 | * | 4/2006 | Wakayama ........... F16H 61/143 192/3.3 |
| 9,709,177 | B2 | * | 7/2017 | Futa ...................... F16K 11/052 |
| 2008/0072978 | A1 | * | 3/2008 | Ishibashi ............. F15B 13/0407 137/625.6 |
| 2012/0145252 | A1 | * | 6/2012 | Hunnicutt ........... F15B 13/0402 137/14 |
| 2013/0105014 | A1 | * | 5/2013 | Brooks ............... F15B 13/0402 137/625.6 |
| 2014/0014451 | A1 | | 1/2014 | Nakata et al. |
| 2015/0020905 | A1 | * | 1/2015 | Strobel ............... F15B 13/0431 137/625.64 |
| 2015/0129070 | A1 | * | 5/2015 | Winkler ................. F16K 31/12 137/625.64 |

OTHER PUBLICATIONS

Garuti, A.; Trailer Brake Valve—Hydraulic Brakes and Servo Assisted Brake System; Jun. 28, 2010; Safim S.p.A.; Modena, Italy; Available at www.safim.it.

Kagerer, Hermann R.; Brake valves for trailers (Betriebsanleitung Abschaltventil); Sep. 23, 2004; Bosch Rexroth AG; Germany.

UNK; Relay valve; Mar. 24, 2011; Bosch Rexroth AG; Germany.

UNK; Trailer Brake Valves; May 25, 2011; Bosch Rexroth AG; Germany.

* cited by examiner

US 9,970,557 B2

MULTI-PILOT VARIABLE PRESSURE RELAY VALVE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to a hydraulic spool valve and, more specifically, to a multi-pilot variable pressure relay spool valve for use with industrial and vehicular hydraulic systems.

Description of Related Art Including Information Disclosed Under 37 CFR 1.97 and 1.98

Heavy off-road vehicles, including tractors with trailed units, have unique braking requirements. Such vehicles are rather large and haul substantial loads, placing great stresses on the brake system. In agricultural settings it is common for trailed units to rely on tongue stresses to regulate and actuate the trailed unit brakes. Such brake systems are rather rudimentary and do not provide for direct control or feedback to the tractor unit's brake system, which limits the operating weight, speed, and roads upon which they may operate.

When vehicle size, load, and/or operating speeds increase, the trailering and trailed unit brake systems are often combined to counter the increased stresses. The brake systems are often divided into a primary (tractor side) and a secondary (trailed unit side) that are joined using a hydraulic pressure relay valve so as to maintain primary to secondary isolation. These typical hydraulic pressure relay valves used in heavy-vehicle braking systems utilize a standard 3-way design configuration with a bolt-on assembly with a unique primary piston diameter that establishes the primary pilot pressure to controlled pressure ratio. The bolt-on assembly further utilizes a spring connection between the primary piston and the relay valve control spool for transfer of operating force thereto. When the primary (trailering unit) pressure increases during braking effort, the forces are transferred to the secondary through pressure on the primary piston actuating the relay valve control spool to direct pressurized fluid to the secondary (trailed unit) brakes. Unfortunately, this spring connection between the primary piston and relay valve control spool prevents positive, direct feedback to the pilot pressure side. This lack of feedback introduces second order delay in operation, severely limiting the reaction and operating characteristics of the relay valve. Moreover, given that the use of antilock brake systems (ABS) is on the rise, this lack of feedback renders such relay valves unfit for use in with ABS.

Industrial hydraulic systems, likewise, utilize the aforementioned hydraulic pressure relay valves to allow a primary pressure system to control a secondary pressure system to produce a clamping force, torque, controlled push/pull, or other mechanical force for performing work. As with current vehicle braking systems, these relay valves impose second order delay in operation due to the lack of positive, direct secondary to primary feedback. Consequently, these systems are also limited in response time and in the ability to finely control the rate at which the output work is performed.

What is needed is a hydraulic pressure relay valve that provides fluid isolation between a primary and secondary hydraulic system, provides a predetermined amplification ratio, and provides the means to incorporate one or more secondary pilot signals capable of modifying the output of the valve without affecting the primary system. The present invention addresses these shortcomings and provides other technical benefits and effects as described and claimed below.

BRIEF SUMMARY OF THE INVENTION

The invention disclosed herein is a multi-pilot variable pressure relay valve device for use with hydraulic systems, and is envisioned in several embodiments. In a first embodiment the device comprises at least one control spool and at least one control piston connected thereto, the control piston having at least one primary surface in fluid communication with at least one primary signal port and at least one secondary surface in fluid communication with at least one secondary signal port and in substantial fluid isolation from the primary surfaces. Additionally, the control spool further comprises at least one fluid passage therethrough, the fluid passage for placing a control signal port in fluid communication with a tank port and a pressure signal port, the control spool positionable to substantially isolate the control signal port from both the tank port and the pressure signal port while allowing a leakage flow therethrough. In another embodiment the control piston is rigidly connected to the control spool.

In yet other embodiments of the multi-pilot variable pressure relay valve device for use with hydraulic systems, the device further comprises a plurality of control pistons; a plurality of control pistons, with at least one control piston rigidly connected to the control spool; a biasing spring for urging the control spool to the first position; and a plurality of primary and/or secondary signal ports for controlling the transitional area of the control spool operation. It is also envisioned that the control piston has at least one secondary surface stepped diameter for modifying a net amplification ratio of the device; or has a plurality of secondary surface stepped diameters for modifying a net amplification ratio of the device.

In another embodiment of the multi-pilot variable pressure relay valve device for use with hydraulic systems, the device comprises a housing having at least one primary signal port, at least one secondary signal port, and at least one control spool positionable within a bore therein, the control spool having at least one fluid passage therethrough and at least one control piston connected thereto, the control piston having at least one primary surface in fluid communication with the at least one primary signal port and at least one secondary surface in fluid communication with the at least one secondary signal port. Additionally, the control spool further comprises a fluid passage for placing a control signal port in fluid communication with a tank port and a pressure signal port, the control spool positionable to substantially isolate the control signal port from both the tank port and the pressure signal port while allowing a leakage flow therethrough. In another embodiment of the device the control piston is rigidly connected to the control spool. Additionally, the device further comprises a plurality of control pistons; a plurality of control pistons, with at least one control piston rigidly connected to the control spool; a biasing spring for urging the control spool to the first position; and a plurality of primary and/or secondary signal ports for controlling a transitional area of the control spool operation. It is also envisioned that the control piston has at least one secondary surface stepped diameter for modifying a net amplification ratio of the device; or has a plurality of secondary surface stepped diameters for modifying a net amplification ratio of the device.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein.

Figure 1:
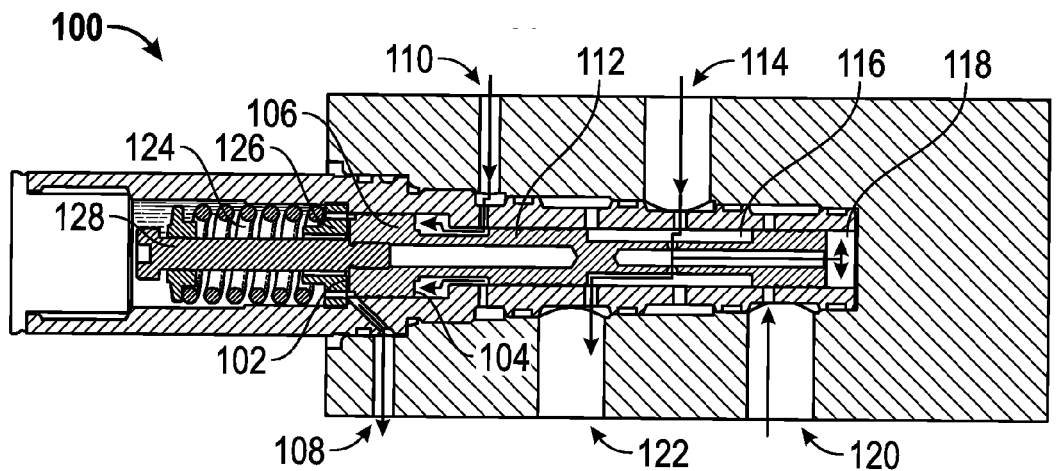
FIG. 1 is a cutaway depiction of a first embodiment of the invention in a resting position.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

FIG. 1 is a cutaway depiction of a first embodiment of the invention in a resting position. As shown the preferred embodiment of the multi-pilot variable pressure relay valve device (100) includes a port block housing a positionable control spool (112) capable of movement therein in proportional response to the net forces acting thereon due to the fluid pressures felt upon the primary face (102) and secondary face (104) of a control piston (106) and upon the feedback face (118). The piston (106) in this embodiment is a machined part of the control spool (112), providing a rigid connection thereto. The bore within the housing within which the piston moves is of sufficient tolerance with the piston such that the primary face (102) is substantially fluid isolated from the secondary face (104). One of ordinary skill will appreciate that another embodiment may weld, cast, press-fit, or thread the piston onto the control spool, or utilize some combination thereof, each of which are within the scope of the claims.

The port block housing includes a primary signal pressure port (108), a secondary signal pressure port (110), a control pressure port (114), a pressure supply port (120), and a tank return port (122). Passages within the control spool (112) direct fluid flow among the control pressure port (114), pressure supply port (120), tank return port (122), and feedback pressure piston (118) in response to pressures applied to the primary signal pressure port (108) and secondary signal pressure port (110). A biasing spring (124) acts between a spring cup base (126) and a retained control stem (128) to maintain the control spool (112) in the depicted resting position (shifted fully left as drawn). Passages (116) within the control spool (112) align the control pressure port (114) and tank return port (122) thereby venting the control pressure to tank. Fluid pressure at the pressure supply port (120) is ineffective as the port is closed off by the shifted control spool (112). Secondary signal pressure applied at the feedback pressure port (110) is felt on the secondary face (104) of the control piston (106), and acts on the spool in conjunction with the positioning spring (124). Pressure on the primary signal port (108) is released or is less than the spring pressure (plus secondary signal pressure, if applicable) so as to maintain this control spool (112) resting position state.

Figure 2:
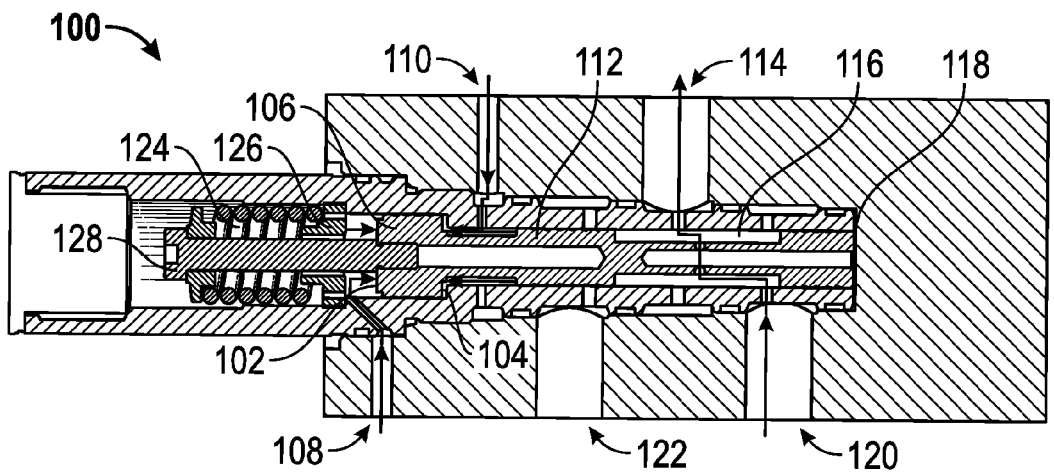
FIG. 2 is a cutaway depiction of the embodiment in a fully shifted position during operation.

FIG. 2 is a cutaway depiction of the embodiment in a fully shifted position during operation. Pressure applied to the primary signal pressure port (108) is felt upon the primary face (102) of the control piston (106), and when this signal pressure exceeds the spring (124) and secondary signal pressure port (110) pressures the control spool (112) moves to the fully shifted position (shifts fully right as drawn). Passages within the control spool (112) close off the tank return port (122) and align the pressure supply port (120) with the control pressure port (114), thereby allowing passage of pressurized fluid into the control pressure port (114) to activate any subsystem connected thereto.

Figure 3:
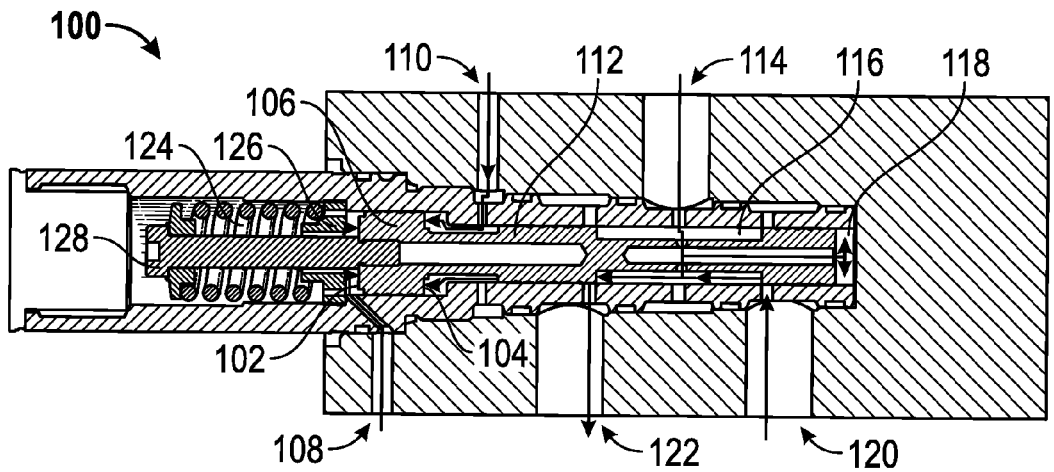
FIG. 3 is a cutaway depiction of the embodiment in a balanced position during operation.

FIG. 3 is a cutaway depiction of the embodiment in a balanced position during operation. Pressure applied to the primary signal pressure port (108) matches the countering pressures provided by the control spring (124) and secondary signal pressure port (110), thereby maintaining the balanced position (centered as drawn). Passages within the control spool (112) are such that both the pressure supply port (120) and tank return port (122) are effectively closed off from the control pressure port (114) with control pressure felt on the feedback piston (118). However, a slight leakage of fluid through each maintains an equilibrium within the control pressure port (114) circuit. In operation the slightest shifting of the control spool (112) toward the rest position (left as drawn) or toward the fully shifted position (right as drawn) will cause the tank return port (122) or pressure supply port (120), respectively, to uncover and activate. Consequently, if signal pressure at the primary signal pressure port (108) increases, the control spool (112) will shift a proportional amount toward the right (as drawn), thereby increasing the pressure port (120) fluid supply pressure felt at the control pressure port (114). Likewise, if the signal pressure at the primary signal pressure port (108) decreases, the control spool (112) will shift a proportional amount toward the left (as drawn), thereby closing the pressure port (120) and relieving a proportional amount of pressure from the control pressure port (114) to the tank return port (122). Secondary signal pressure (110) in conjunction with the positioning spring (124) pressure and feedback (118) pressure determines the amount of primary signal pressure (108) necessary to displace the control spool (112). The relay valve automatically acts to regulate the control pressure. If an external effect causes the control pressure to increase or decrease, the feedback pressure (118) changes and causes the spool to shift left or right, respectively, to maintain the force/pressure balance.

The primary signal or pilot pressure control pressure basic amplification ratio of the device (100) is determined by the primary face (102) surface area to feedback face (118) surface area ratio. Choice of the basic amplification ratio for a given end use is within the skill of one of ordinary skill, and is motivated by the primary system pressure range in relation to the secondary system pressure range to be controlled. Typically, the basic amplification ratio is chosen such that the maximum primary system pressure produces the desired secondary system pressure. However, the amplification ratio may be established to produce any desired primary to secondary system pressure effect, and the addition of a secondary pilot surface affects the net amplification ratio when the secondary pilot pressure is active. The choice of primary pilot surface area to feedback surface area ratio determines the area of the secondary pilot surface (104) necessary to effect the desired net amplification ratio. For example, when a secondary pilot is utilized and active the resultant force on the secondary face (104) works in conjunction with the feedback face (118) forces to counter the primary face (102) forces. When a secondary pilot is used selection of the resulting pressure range to produce the desired system response is, likewise, within the skill of one of ordinary skill.

The materials used in construction of the multi-pilot variable pressure relay valve device (100) are primarily metal, and are common to known hydraulic pressure relay valves. Non-metal components may be common O-ring or other gasket materials chosen to minimize fluid leakage among and from components. Moreover, the machining methods utilized to form the ports and spool passages are, likewise, common with regard to known hydraulic pressure relay valves. It is within the skill of one of ordinary skill to choose such suitable materials and machining methods to create the device (100) as depicted and described herein.

Figure 4:
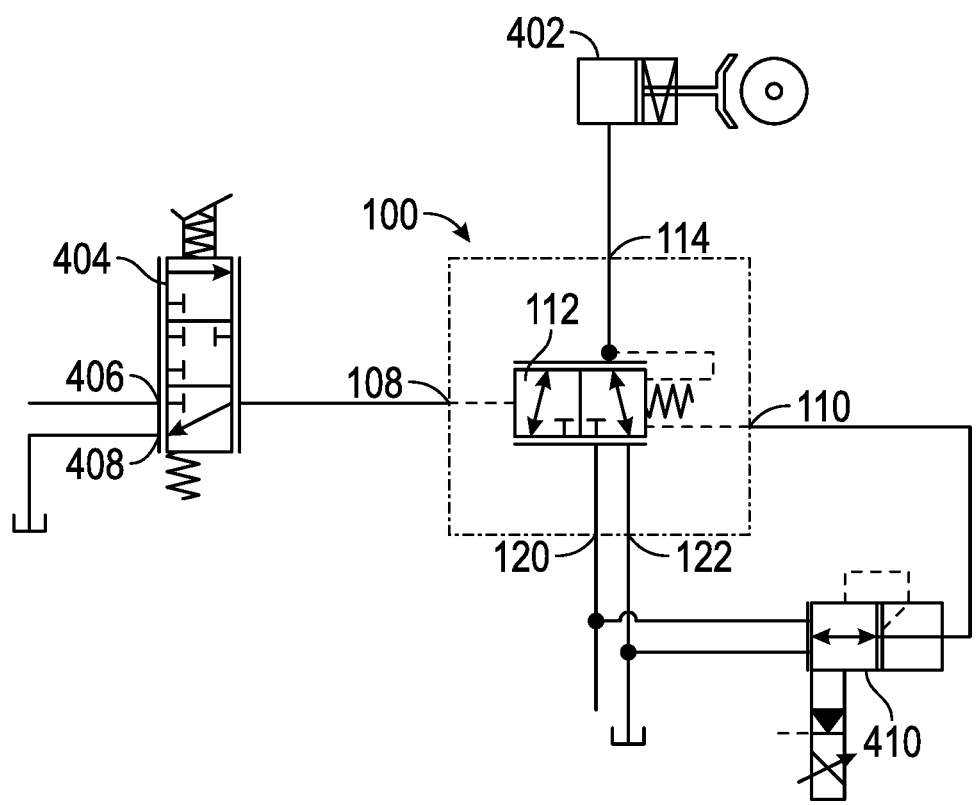
FIG. 4 is a schematic depiction of use of the embodiment in an ABS brake control application.

FIG. 4 is a schematic depiction of use of the embodiment in an ABS brake control application. Major components of the ABS brake system include the brake caliper(s) (402), brake valve (404), multi-pilot variable pressure relay valve device (100), and ABS feedback pressure control device (410) with a variable solenoid actuator. Manual actuation of the brake valve (404) results in a proportional application of primary braking pressure (406) to the primary signal pressure port (108). When the brake valve (404) is released the braking pressure on the signal pressure port (108) is released and returned to tank (408).

As described previously, when the primary signal pressure port (108) pressure is released, the control valve device (100) control spool (112) is urged by the control spring in conjunction with the feedback (118) force and any active pressures on the secondary signal pressure port(s) (110) to its rest state wherein the control pressure port (114) aligned with the tank return port (122). Thus, the brake pressure is released from the brake caliper(s) (402). As the brake valve (404) is actuated the signal pressure (108) increases proportionally to the actuation, causing the control spool (112) to shift from the rest state thereby aligning the pressure supply port (120) with the control pressure port (114), thereby increasing the fluid pressure at the brake caliper(s) (402) causing each to actuate. The ABS feedback pressure control device gradually applies fluid pressure to the secondary signal pressure port(s) (110), thereby moving the control spool (112) toward the balanced state as described above. In the balanced state the ABS feedback pressure is controlled tightly by a common ABS controller device (not shown).

As the braking force is applied by the caliper(s) (402), the wheel speed is monitored by a common ABS controller device. In general, the ABS controller senses wheel speed in relation to the vehicle speed and detects for wheel lockup due to loss of wheel/surface traction. Detailed operation of ABS controller devices is well understood and need not be described herein. When lockup occurs, the ABS controller signals the ABS feedback pressure control device (410) to oscillate the secondary signal pressure(s) (110) at a high rate, which in turn causes the control spool (112) to oscillate. This oscillation of the control spool (112) around the balanced position alternatively exposes the control pressure port (114) to tank return (122) and pressure supply (120). Consequently, the brake caliper(s) (402) grip and release the brake rotors, thereby generating the ABS wheel control braking action.

Figure 5:
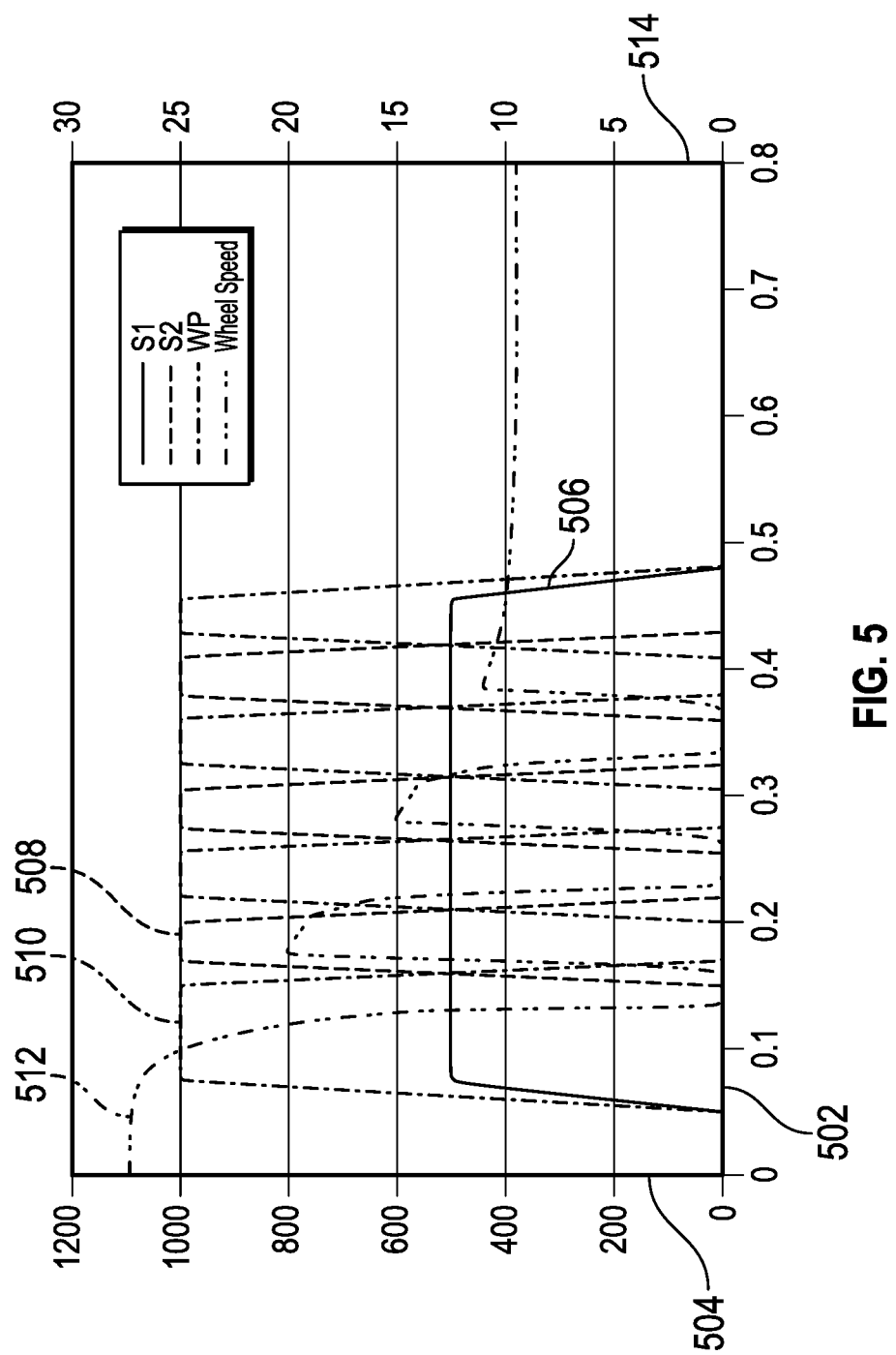
FIG. 5 is a graph depicting the response characteristics of the embodiment in the ABS brake control application.

FIG. 5 is a graph depicting the response characteristics of the embodiment in the ABS brake control application. The graph includes signal pressure (506) from the brake valve, feedback pressure (508), control pressure (510), and wheel speed (512). The graph plots fluid pressure (504) to wheel speed (514) over time (502). As the brake is applied and held (506), the wheel speed (512) slows due to increasing control pressure (510). When the wheel locks the feedback pressure (508) rises to force the release of the control pressure (510), thereby unlocking the wheel so that the wheel speed (512) increases once more. The feedback pressure (508) is then removed so that the control pressure (510) increases once more, slowing the wheel speed (512) until it locks and the cycle repeats. During computer simulation of the system it was determined that the embodiment in the ABS configuration as described achieved 20-30 Hz response times, which is a substantial improvement over operator controlled braking.

Figure 6:
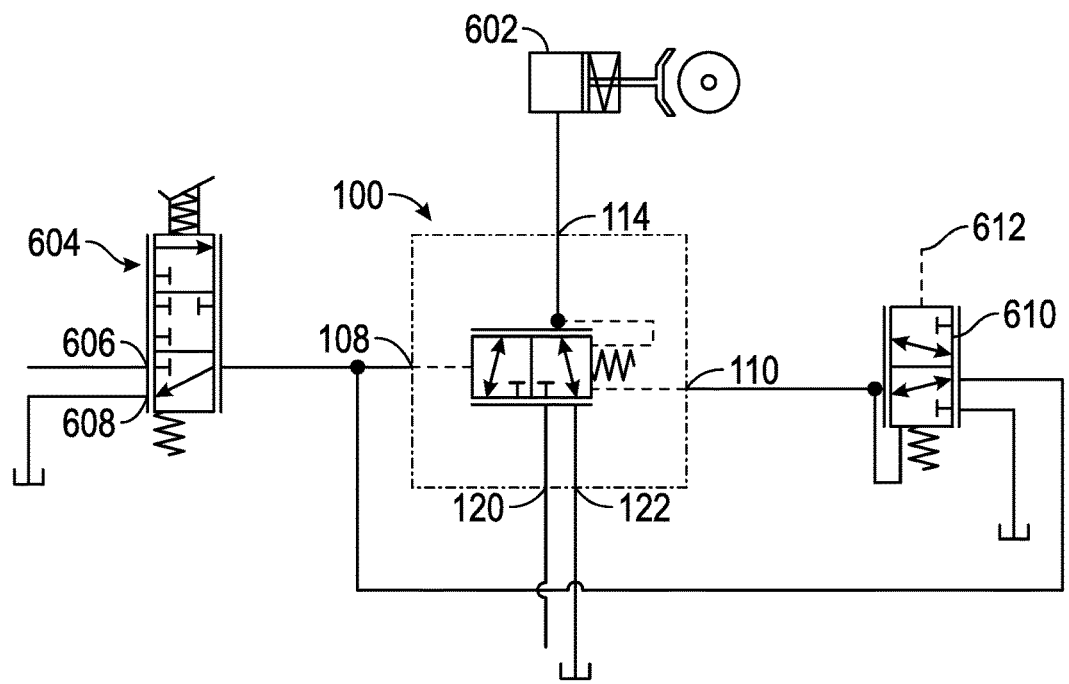
FIG. 6 is a schematic depiction of use of the embodiment in a load proportional brake control application.

Given the superior operating characteristics, other applications of the device are also envisioned and are within the scope of the claims. For example, FIG. 6 is a schematic depiction of use of the embodiment in a load proportional brake control application. Major components include the brake caliper(s) (602), brake valve (604), multi-pilot variable pressure relay valve device (100), and proportional feedback control device (610). The proportional feedback control device (610) receives a signal (612) that is proportional to the load being carried by the trailed unit. The load being carried may be sensed in a number of different ways, each of which is within the skill of one of ordinary skill. For example, strain gauges mounted on the trailed unit chassis may detect weight placed upon the chassis or strain gauges mounted on the tongue may detect pulled weight. A proportional controller receiving this load signal then generates a proportional signal (612) that causes a shift in the feedback control device (610) control spool, which alternates the application of primary signal pressure (108) to or tank return from the secondary signal pressure port(s) (110). Thus, the feedback pressure signal felt at the secondary signal pressure port(s) (110) can be varied in real time as the load changes. Operation of the control valve device (100) is as before, in response to the proportional load signal.

Figure 7:
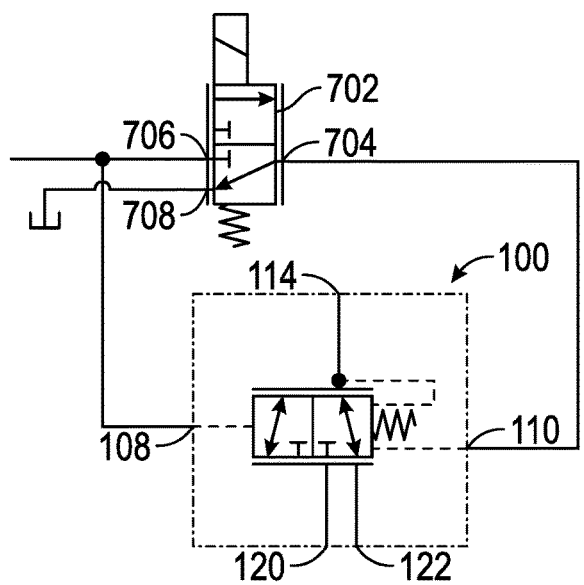
FIG. 7 is a schematic depiction of use of the embodiment in a live selectable pressure control arrangement.

FIG. 7 is a schematic depiction of use of the embodiment in a live selectable pressure control arrangement. Such a live selectable pressure control arrangement may be substituted for the proportional feedback control device (610) above. In this arrangement a live selectable pressure control valve (702) with an on/off actuator is utilized allowing live selection of the application of signal pressure (706) to, or tank return (708) from, the secondary signal pressure port(s) (110) of the multi-pilot variable pressure relay valve device (100). With the live selectable pressure control valve (702) in the "off" position as depicted, the secondary signal pressure port(s) (110) is released to tank return (708), which yields an n:1 pressure ratio. With the live selectable pressure control valve (702) in the "on" position the control valve device (702) spool is shifted and the secondary signal pressure port(s) (110) receives the full signal pressure (706), which yields a 1:1 brake pressure ratio. The "n" in the ratio is again determined by the primary face (102) surface area to feedback face (118) surface area ratio of the multi-pilot variable pressure relay valve device (100) control spool (112).

Figure 8:
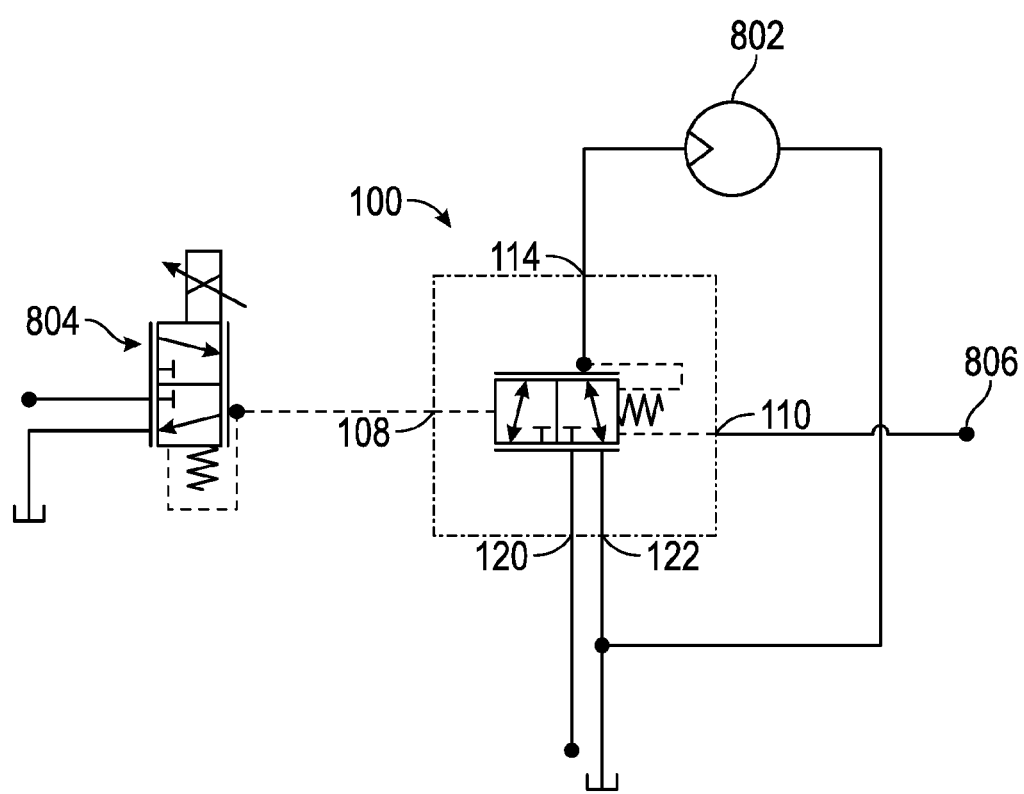
FIG. 8 is a schematic depiction of use of the embodiment in an industrial motor torque control application.

Industrial applications for the multi-pilot variable pressure relay valve device (100) include, but are not limited to, applications such as motor torque control and clamping force control. FIG. 8 is a schematic depiction of use of the embodiment in an industrial motor torque control application. Major components include a hydraulic motor (802) and an adjustable solenoid valve (804) that provides the primary signal pressure for actuating the motor (802). During operation, the solenoid valve (804) is actuated to pressurize the primary signal pressure port (108), shifting the control spool position of the device (100) such that pressure (120) is directed to the torque motor (802) via the control pressure port (114). A process sensing means (not shown) monitors the industrial process to ascertain the motor torque output and generates a process feedback signal pressure (806) proportional to the motor torque and that is felt at the secondary signal pressure port (110). This process feedback pressure (806) opposes the primary signal pressure (108), thereby repositioning the control spool to maintain the motor torque at a desired limit. The process sensing means is application specific and its selection and operation is well within the skill of one of ordinary skill and can include use of strain gauges and other common pressure sensing means.

Figure 9:
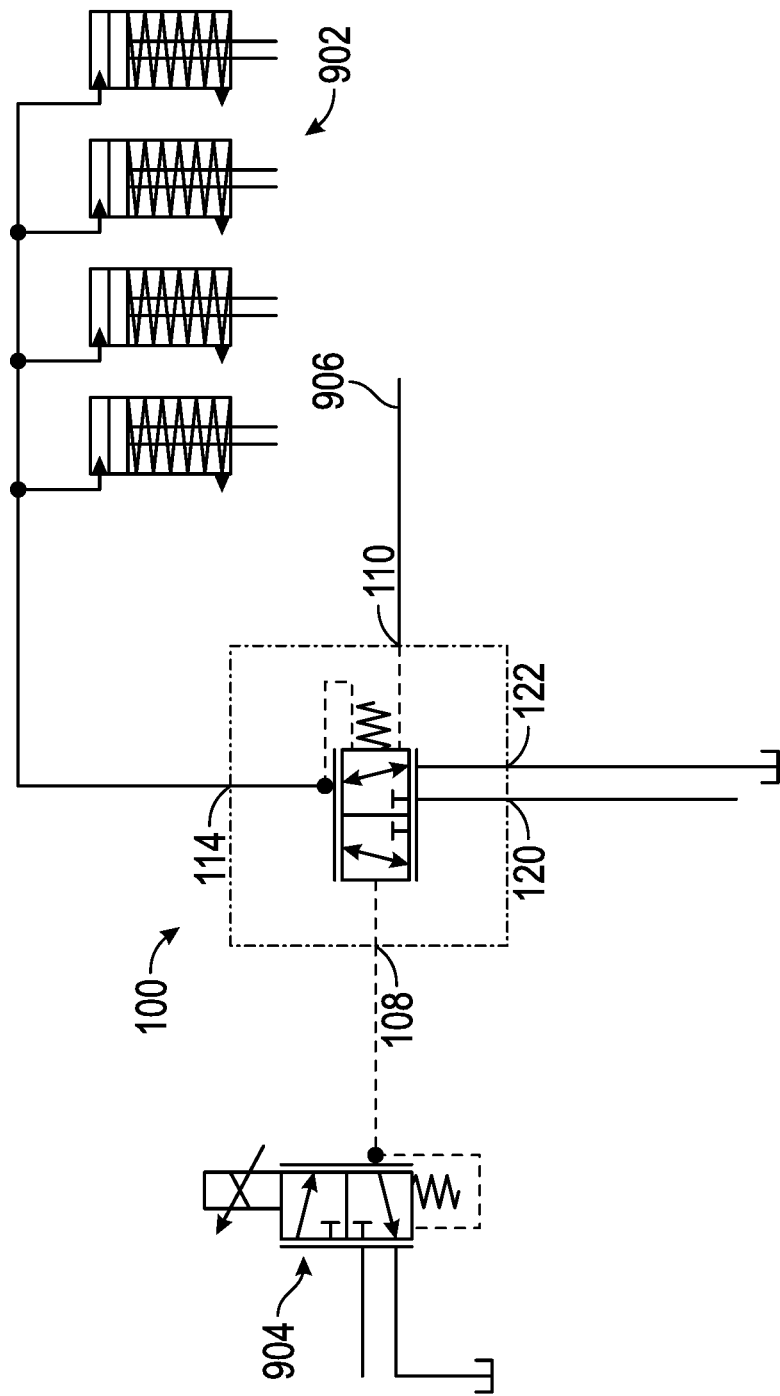
FIG. 9 is a schematic depiction of use of the embodiment in an industrial clamping force control application.

FIG. 9 is a schematic depiction of an industrial clamping force control application. Major components include one or more hydraulic cylinders (902) for generating the clamping force and an adjustable solenoid valve (904) that provides the primary signal pressure for actuating the cylinders (902). During operation, the solenoid valve (904) is actuated to pressurize the primary signal pressure port (108), shifting the control spool position of the device (100) such that pressure (120) is directed to the hydraulic cylinders (902) via the control pressure port (114). As with the motor torque control application above, a process sensing means (not shown) monitors the industrial process to ascertain the clamping force being applied and generates a process feedback signal pressure (906) proportional to the clamping force and that is felt at the secondary signal pressure port (110). This process feedback pressure (906) opposes the primary signal pressure (108), thereby repositioning the control spool to maintain the clamping force at a desired limit. The process sensing means is application specific and its selection and operation is well within the skill of one of ordinary skill and can include use of strain gauges and other common pressure sensing means.

Although a single secondary signal pressure port is described above, it is envisioned and is within the scope of the invention claimed herein that multiple such signal pressure ports may be utilized and independently or jointly controlled (or some combination thereof). Accordingly, the previous examples of use of the device (100) may utilize one or more secondary signal pressure ports as needed. Use of multiple secondary signal pressure ports is application specific, the requirements of which may be readily determined by one of ordinary skill. Use of multiple secondary signal pressures allows, for example, active control of the transitional area of the control spool valve (112). The transitional area is effectively the balanced position as described above, and movement of the control spool (112) about this balanced position. Use of multiple secondary signal pressures also affords additional modification of the basic amplification ratio to a different net amplification ratio as that term is described above. Moreover, multiple control pistons may be utilized with multiple secondary pilot signals instead of or in addition to a single control piston having a stepped face.

Figure 10:
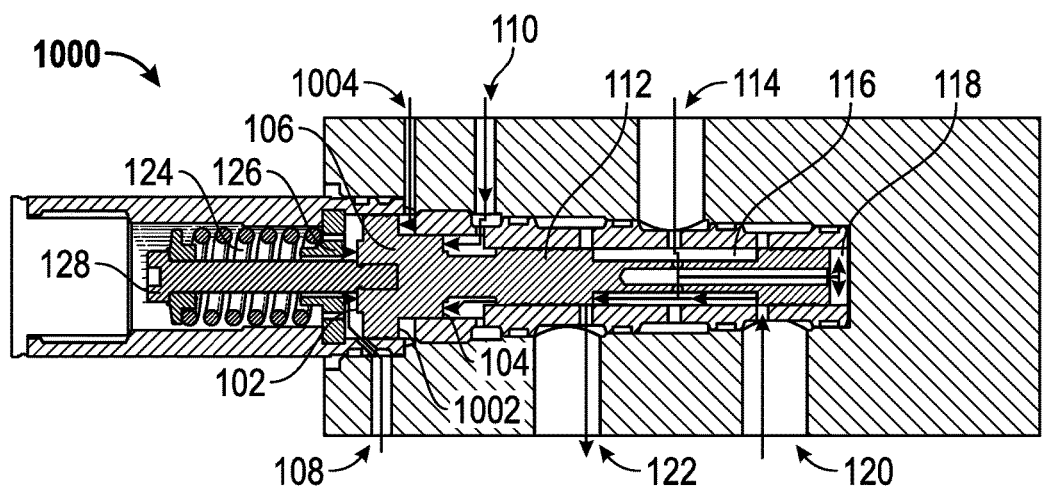
FIG. 10 is a cutaway depiction of another embodiment having a plurality of secondary pilot signal ports, with the spool in a balanced position during operation.

FIG. 10 is a cutaway depiction of another embodiment having a plurality of secondary pilot signal ports, with the spool in a balanced position during operation. As shown, the control piston (106) provides the primary face (102) and a stepped secondary face (1002 and 104) for two separate secondary pilot signals (1004 and 110, respectively). The first secondary pilot signal (110) operating on the first secondary face (104) of the piston combines with the second secondary pilot signal (1004) operating on the second secondary face (1002) of the piston. The combination of these two signals counter the primary pilot signal (108) to control the operation of the device (1000). In other embodiments an additional number of secondary pilot signals may be utilized. In still other embodiments it is possible to incorporate multiple primary pilot signals as well, utilizing multiple stepped faces on the primary face side of the piston (106).

In another embodiment the biasing spring (124) is optional. Without the biasing spring the valve position is controlled solely by the balance of fluid pressures on the primary face (102) and secondary faces (1002 and 104). For example, in such an arrangement the system may provide a base primary pressure (108) that is exactly countered by a first secondary pilot pressure (110) to position the spool in the balanced position as shown (1000). Increase in primary pressure (108), which displaces the spool (112) to the right is then countered by feedback from the second secondary pilot pressure (1004). Again, the rigid linkage between the piston (106) and control spool (112) affords instantaneous response of the device to pressure changes.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. While various alterations and permutations of the invention are possible, the invention is to be limited only by the following claims and equivalents. Further, any recitation of method steps does not denote a particular sequence for execution of the steps. Such method steps may therefore be performed in a sequence other than that recited unless the particular claim expressly states otherwise.

I claim:

1. A multi-pilot variable pressure relay valve device for use with hydraulic systems, the device comprising:
at least one control spool and at least one control piston connected thereto, the control piston having at least one primary surface in fluid communication with at least one primary signal port and at least one secondary surface in fluid communication with at least one secondary signal port and in substantial fluid isolation from the at least one primary surface, the control spool having a feedback surface in fluid communication with a control pressure port, wherein the primary surface area to feedback surface area ratio establishes a net amplification ratio of a variable pressure relay valve device, and the at least one secondary signal port for controlling a balanced position of the control spool operation, wherein the balanced position is a position between a leftmost position and a rightmost position of the control spool.

2. The device of claim 1, the control spool further comprising at least one fluid passage therethrough, the fluid passage for placing the control pressure port in fluid communication with a tank port and a pressure signal port, the control spool positionable in the balanced position to substantially isolate the control pressure port from both the tank port and the pressure signal port while allowing a leakage flow from the pressure signal port through the fluid passage to the tank port.

3. The device of claim 1, wherein the control piston is rigidly connected to the control spool.

4. The device of claim 1, the device further comprising a plurality of control pistons.

5. The device of claim 1, the device further comprising a plurality of control pistons, with at least one control piston rigidly connected to the control spool.

6. The device of claim 1, the device further comprising a biasing spring for urging the control spool to a resting position.

7. The device of claim 1, the control piston having at least one secondary surface for modifying the net amplification ratio of the device.

8. The device of claim 1, the control piston having a plurality of secondary surfaces for modifying the net amplification ratio of the device.

9. The device of claim 1, the device further comprising a plurality of secondary signal ports, each in fluid communication with a secondary surface for aiding the biasing spring.

10. The device of claim 1, further comprising a control spool fluid passage in fluid communication with the control pressure port, the control spool fluid passage allowing a slight leakage of fluid from a pressure supply port to a tank return port while the control spool is in the balanced position, thereby maintaining an equilibrium pressure within the control pressure port.

11. A multi-pilot variable pressure relay valve device for use with hydraulic systems, the device comprising:
a housing having at least one primary signal port, at least one secondary signal port, at least one control pressure port, and at least one control spool positionable within a bore therein, the control spool having at least one fluid passage therethrough and at least one control piston connected thereto, the control piston having at least one primary surface in fluid communication with the at least one primary signal port and at least one secondary surface in fluid communication with the at least one secondary signal port, the secondary surface in substantial fluid isolation from the primary surface, the control spool having a feedback surface in fluid communication with the at least one control pressure port, wherein the primary surface area to feedback surface area ratio establishes a net amplification ratio of a variable pressure relay valve device, and the at least one secondary signal port for controlling a balanced position of the control spool operation, wherein the balanced position is a position between a leftmost position and a rightmost position of the control spool.

12. The device of claim 11, the device further comprising a control spool fluid passage for placing the control pressure port in fluid communication with a tank port and a pressure signal port, the control spool positionable in the balanced position to substantially isolate the control pressure port from both the tank port and the pressure signal port while allowing a leakage flow from the pressure signal port through the fluid passage to the tank port.

13. The device of claim 11, wherein the control piston is rigidly connected to the control spool.

14. The device of claim 11, the device further comprising a plurality of control pistons.

15. The device of claim 11, the device further comprising a plurality of control pistons, with at least one control piston rigidly connected to the control spool.

16. The device of claim 11, the device further comprising a biasing spring for urging the control spool to a resting position.

17. The device of claim 11, the control piston having at least one secondary surface for modifying the net amplification ratio of the device.

18. The device of claim 11, the control piston having a plurality of secondary surfaces for modifying the net amplification ratio of the device.

19. The device of claim 11, the device further comprising a plurality of secondary signal ports, each in fluid communication with a secondary surface for aiding the biasing spring.

20. The device of claim 11, further comprising a control spool fluid passage in fluid communication with the control pressure port, the control spool fluid passage allowing a slight leakage of fluid from a pressure supply port to a tank return port while the control spool is in the balanced position, thereby maintaining an equilibrium pressure within the control pressure port.

* * * * *